United States Patent
Sako et al.

(10) Patent No.: US 9,543,763 B2
(45) Date of Patent: Jan. 10, 2017

(54) POWER CONTROL APPARATUS, POWER TRANSMISSION APPARATUS, AND POWER CONTROL SYSTEM

(71) Applicant: Sony Corporation, Tokyo (JP)

(72) Inventors: Yoichiro Sako, Tokyo (JP); Yasuhiro Yamada, Kanagawa (JP); Akira Tange, Tokyo (JP); Satoshi Higano, Kanagawa (JP)

(73) Assignee: Sony Corporation, Tokyo (JP)

( * ) Notice: Subject to any disclaimer, the term of this patent is extended or adjusted under 35 U.S.C. 154(b) by 662 days.

(21) Appl. No.: 13/680,748

(22) Filed: Nov. 19, 2012

(65) Prior Publication Data

US 2013/0138256 A1 May 30, 2013

(30) Foreign Application Priority Data

Nov. 25, 2011 (JP) ................. 2011-257602

(51) Int. Cl.
| | |
|---|---|
| G05D 3/12 | (2006.01) |
| G05D 5/00 | (2006.01) |
| H02J 3/38 | (2006.01) |
| H02J 3/14 | (2006.01) |
| G05B 15/02 | (2006.01) |
| G06Q 50/06 | (2012.01) |
| H02J 3/00 | (2006.01) |

(52) U.S. Cl.
CPC .............. *H02J 3/382* (2013.01); *G05B 15/02* (2013.01); *G06Q 50/06* (2013.01); *H02J 3/14* (2013.01); *H02J 2003/003* (2013.01); *H02J 2003/143* (2013.01); *Y02B 70/3225* (2013.01); *Y02B 70/3266* (2013.01); *Y04S 20/222* (2013.01); *Y04S 20/242* (2013.01)

(58) Field of Classification Search
CPC ........ H02J 3/382; H02J 2003/003; H02J 3/14; H02J 2003/143; Y04S 20/222; Y04S 20/242; G05B 15/02; G06Q 50/06; Y02B 70/3225; Y02B 70/3266
USPC .................................................. 700/286–298
See application file for complete search history.

(56) References Cited

U.S. PATENT DOCUMENTS

| | | | | |
|---|---|---|---|---|
| 2005/0165511 | A1* | 7/2005 | Fairlie | 700/286 |
| 2006/0208571 | A1* | 9/2006 | Fairlie | 307/11 |
| 2009/0076661 | A1* | 3/2009 | Pearson et al. | 700/291 |
| 2009/0093916 | A1* | 4/2009 | Parsonnet et al. | 700/286 |
| 2010/0076615 | A1* | 3/2010 | Daniel et al. | 700/293 |

(Continued)

FOREIGN PATENT DOCUMENTS

| | | |
|---|---|---|
| CN | 1949658 A | 4/2007 |
| CN | 101253462 A | 8/2008 |

(Continued)

*Primary Examiner* — Mohammad Ali
*Assistant Examiner* — Ziaul Karim
(74) *Attorney, Agent, or Firm* — Wolf, Greenfield & Sacks, P.C.

(57) ABSTRACT

There is provided a power control apparatus including an input unit to which attribute information regarding a type of generation of power is input, a determination unit configured to determine the type of generation of the power corresponding to the attribute information according to the attribute information, and a power control unit configured to control use of the power according to a determination result by the determination unit.

21 Claims, 9 Drawing Sheets

(56) References Cited

U.S. PATENT DOCUMENTS

| | | | |
|---|---|---|---|
| 2010/0217452 A1* | 8/2010 | McCord | G06Q 50/06 |
| | | | 700/295 |
| 2010/0217642 A1* | 8/2010 | Crubtree | G06Q 10/00 |
| | | | 705/7.12 |
| 2010/0225008 A1 | 9/2010 | Lee et al. | |
| 2010/0235008 A1* | 9/2010 | Forbes, Jr. | G06Q 10/00 |
| | | | 700/291 |
| 2011/0133688 A1* | 6/2011 | Ishibashi | 320/101 |
| 2011/0183733 A1* | 7/2011 | Yoshida et al. | 463/1 |
| 2011/0238232 A1* | 9/2011 | Tomita et al. | 700/291 |
| 2013/0073098 A1* | 3/2013 | Gan | H02J 3/32 |
| | | | 700/286 |
| 2013/0197710 A1* | 8/2013 | Hansen | 700/297 |
| 2013/0345884 A1* | 12/2013 | Forbes, Jr. | 700/286 |

FOREIGN PATENT DOCUMENTS

| | | |
|---|---|---|
| CN | 102236349 A | 11/2011 |
| JP | 10-042472 A | 2/1998 |
| JP | 2001-184406 A | 7/2001 |
| JP | 2004-246685 A | 9/2004 |
| JP | 2011-125122 | 6/2011 |
| JP | 2011-135748 | 7/2011 |
| JP | 2011-142771 | 7/2011 |
| JP | 2011-182555 A | 9/2011 |
| JP | 2001-306191 | 11/2011 |

* cited by examiner

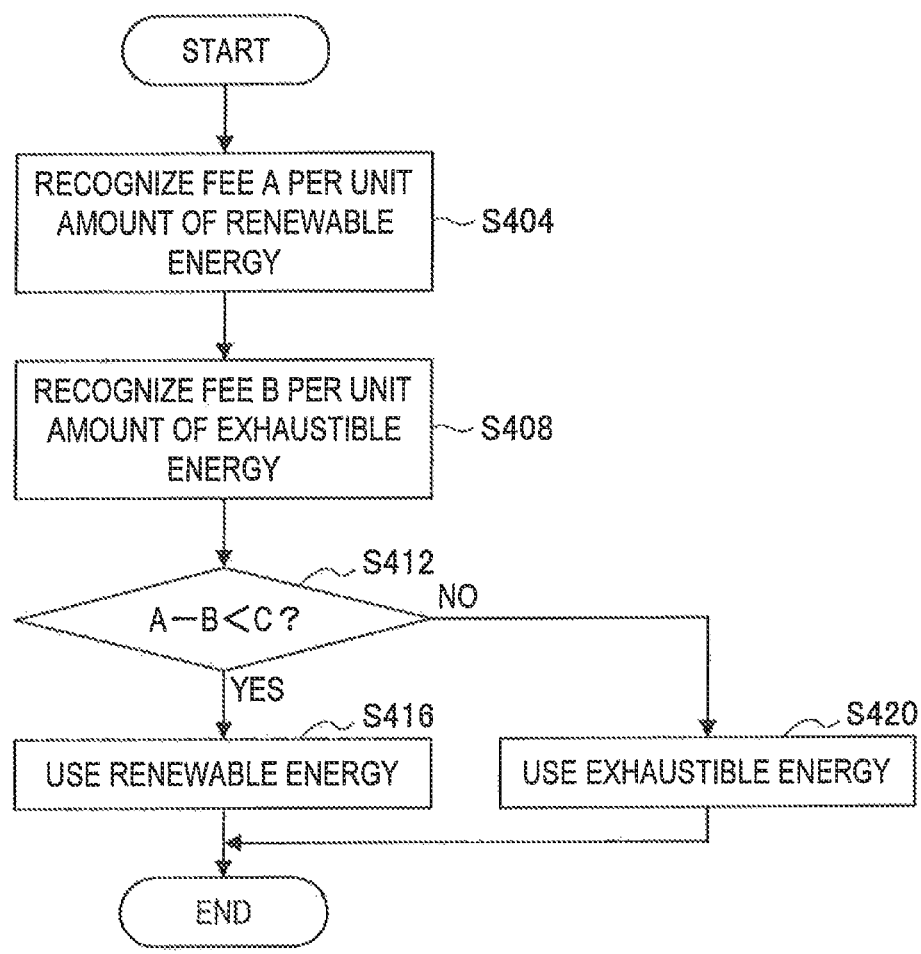

POWER CONTROL APPARATUS, POWER TRANSMISSION APPARATUS, AND POWER CONTROL SYSTEM

BACKGROUND

The present disclosure relates to a power control apparatus, a power transmission apparatus, and a power control system.

Recently, with regard to power generation, societal awareness of an amount of greenhouse gas emissions and nuclear power generation has increased. In particular, the pros and cons of nuclear power generation and the introduction of renewable energy have been examined more closely due to the accident that occurred at the Fukushima Daiichi Nuclear Power Plant (NPP) in 2011.

For example, in Japanese Patent Application Publication No, 2011-125122, a battery control apparatus for controlling electrical storage for a battery from a point of view of renewable energy is disclosed. Specifically, the battery control apparatus disclosed in Japanese Patent Application Publication No. 2011-125122 controls how power stored in the battery is used, a timing at which power stored in the battery is sold to an electrical power company, a timing at which power for storage in the battery is purchased, and the like based on a predicted amount of power generation of renewable energy.

On the other hand, as disclosed in Japanese Patent Application Publication Nos. 2001-306191, 2011-135748, and 2011-142771, power transmission using a packetized power packet is also well known. According to the power transmission using the power packet, attribute information of power can be transmitted in a header field along with the power.

SUMMARY

Here, power supplied by the electrical power company includes power obtained by various types of power generation such as thermal power generation, water power generation, and nuclear power generation. However, the use of the power supplied by the electrical power company is not controlled according to a type of generation of the power.

It is desirable to provide a novel and improved power control apparatus, power transmission apparatus, and power control system capable of controlling the use of power according to a type of power generation.

In accordance with an embodiment of the present disclosure, there is provided a power control apparatus including: an input unit to which attribute information regarding a type of generation of power is input; a determination unit configured to determine the type of generation of the power corresponding to the attribute information according to the attribute information; and a power control unit configured to control use of the power according to a determination result by the determination unit.

In accordance with another embodiment of the present disclosure, there is provided a power transmission apparatus including: a power transmission unit; and an information, addition unit configured to add priority information and attribute information regarding a type of generation of power to the power to be transmitted from the power transmission unit.

In accordance with still another embodiment of the present disclosure, there is provided a power control system including: a power transmission apparatus; and a power control apparatus, wherein the power transmission apparatus includes a power transmission unit; and an information addition unit configured to add attribute information regarding a type of generation of power to the power to be transmitted from the power transmission unit, and wherein the power control apparatus includes an input unit to which the attribute information is input; a determination unit configured to determine the type of generation of the power corresponding to the attribute information according to the attribute information; and a power control unit configured to control use of the power according to a determination result by the determination unit.

In accordance with the embodiments of the present disclosure described above, the use of power can be controlled according to a type of power generation.

BRIEF DESCRIPTION OF THE DRAWINGS

FIG. 5 is a flowchart illustrating a second control example by the power control unit;

DETAILED DESCRIPTION OF THE EMBODIMENT(S)

Figure 1:
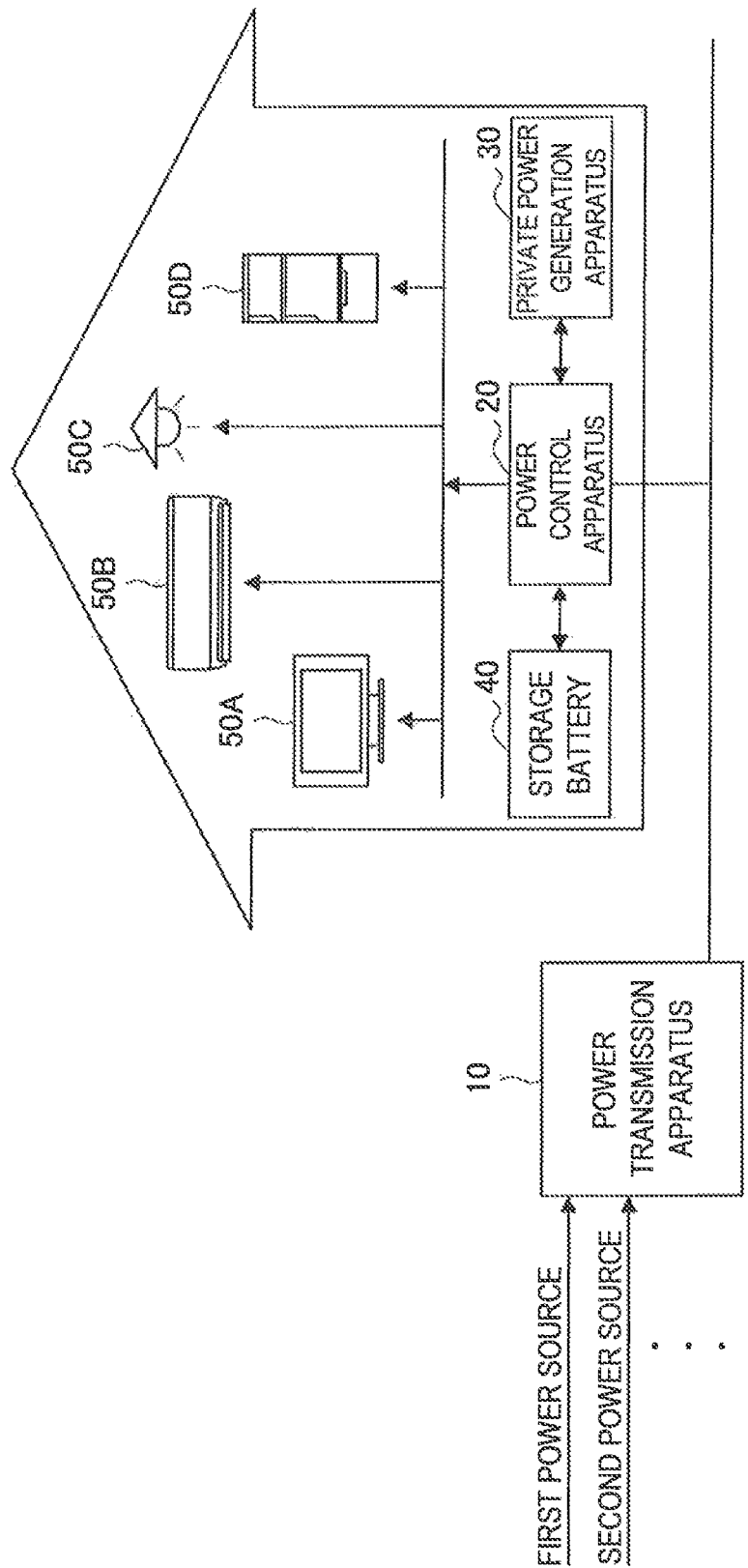
FIG. 1 is an explanatory diagram illustrating a configuration of a power control system in accordance with an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, in this specification and the drawings, a plurality of structural elements having substantially the same function and structure may be distinguished by adding different letters after the same reference numerals. For example, the plurality of structural elements having substantially the same function and structure are distinguished as necessary, for example, electrical devices 50A, 50B, and 50C. When it is not necessary to distinguish the plurality of structural elements having substantially the same function and structure, the plurality of structural elements are denoted by the same reference numeral only. For example, when it is not necessary to particularly distinguish the electrical devices 50A, 50B, and 50C, these are simply referred to as the electrical device 50.

In addition, description will be given in the following order.

1. Configuration of Power Control System
2. Configuration of Power Transmission Apparatus
3. Configuration of Power Control Apparatus
4. Specific Example of Power Control
5. Conclusion

1. BASIC CONFIGURATION OF POWER CONTROL SYSTEM

Technology of the present disclosure can be practiced in various forms as will be described hereinafter as one example. In addition, a power control system in accordance with this embodiment includes:

A. a power transmission apparatus 10 having a power transmission unit 120 and an information addition unit (a packet generation unit 110), which adds priority information and attribute information regarding a type of generation of power to the power to be transmitted from the power transmission unit; and B. a power control apparatus 20 having an input unit (a power input unit 240) to which the attribute information is input, a determination unit 242, which determines the type of generation of the power corresponding to the attribute information according to the attribute information, and a power control unit 244, which controls use of the power according to a determination result by the determination unit.

Hereinafter, a basic configuration of the above-described power control system will be first described with reference to FIG. 1.

FIG. 1 is an explanatory diagram illustrating the configuration of the power control system in accordance with the embodiment of the present disclosure. As illustrated in FIG. 1, the power control system in accordance with the embodiment of the present disclosure includes the power transmission apparatus 10, the power control apparatus 20, a private power generation apparatus 30, a storage battery 40, and the electrical devices 50A to 50D.

(Power Transmission Apparatus)

The power transmission apparatus 10 transmits power supplied from a power generation facility via a power transmission line. A type of generation of power in the power generation facility is not particularly limited. For example, the type of power generation may be a type of power generation of renewable energy like water power generation, solar power generation, solar thermal power generation, wind power generation, geothermal power generation, wave power generation, temperature difference power generation, biomass power generation and pumped-storage power generation, or a type of power generation of exhaustible energy like thermal power generation (power generation using fossil fuels such as coal, oil, natural gas, and methane hydrate) or nuclear power generation (power generation using an underground resource such as uranium). Although a first power source and a second power source are illustrated as a power source for the power transmission apparatus 10 in FIG. 1, a larger number of power sources may be supplied to the power transmission apparatus. In addition, the power transmission apparatus 10 may be managed by an electrical power company, and power to be transmitted from the power transmission apparatus 10 may be commercial power.

(Private Power Generation Apparatus)

The private power generation apparatus 30 is an apparatus for generating (privately generating) power at a power user side. A solar power generation apparatus, a fuel battery, a wind power generation apparatus, and the like are used as the private power generation apparatus 30. The power privately generated by the above-described private power generation apparatus 30 is supplied to the power control apparatus 20.

(Storage Battery)

The storage battery 40 is a secondary battery capable of being repeatedly used by charging. For example, the storage battery 40 stores privately generated power that is supplied according to control of the power control apparatus 20. In addition, the power stored in the storage battery 40 is supplied to the electrical devices 50A to 50D according to the control of the power control apparatus 20.

(Electrical Device)

The electrical device 50 is an apparatus using power as a power source, and a type of the electrical device 50 is various. For example, in FIG. 1, a display apparatus is illustrated as the electrical device 50A, an air conditioner is illustrated as the electrical device 50B, an illuminating apparatus is illustrated as the electrical device 50C, and a refrigerator is illustrated as the electrical device 50D. Because the power consumption of the air conditioner or the refrigerator among these electrical devices 50 increases during daytime in summer, the power demand may usually be at peak during daytime. On the other hand, because the power consumption of the air conditioner increases during nighttime in winter, the power demand may usually be at peak during nighttime.

(Power Control Apparatus)

The power control apparatus 20 controls the use of power supplied from the power transmission apparatus 10 or privately generated power supplied from the private power generation apparatus 30. In addition, the power control apparatus 20 controls electrical storage for the storage battery 40, the use of power stored in the storage battery 40, and the like.

Here, the power control apparatus 20 in accordance with this embodiment can control the use of power supplied from the power transmission apparatus 10 according to a type of generation of power. For example, the power control apparatus 20 can prioritize, for example, the use of renewable energy, by selectively acquiring power obtained according to a predetermined type of power generation from the power supplied from the power transmission apparatus 10.

The selective acquisition of power by the power control apparatus 20 as described above can be implemented through power packetization by the power transmission apparatus 10. Hereinafter, the above-described power transmission apparatus 10 will be more specifically described. Although an example in which the power transmission apparatus 10 packetizes power so that the power control apparatus 20 selectively acquires power will be described in this specification, the power control apparatus 20 can selectively acquire power even in a method of providing a power transmission line for every type of power generation.

2. CONFIGURATION OF POWER TRANSMISSION APPARATUS

Figure 2:
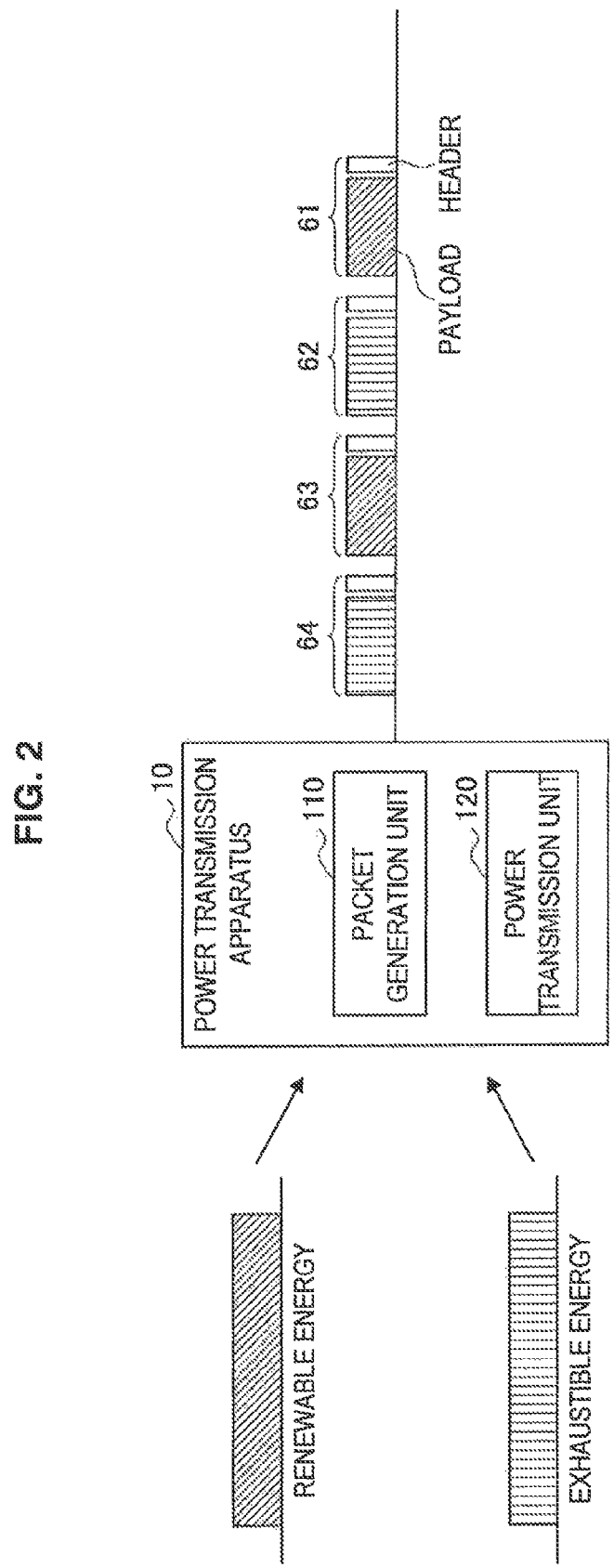
FIG. 2 is an explanatory diagram illustrating a configuration of a power transmission apparatus.

FIG. 2 is an explanatory diagram illustrating a configuration of the power transmission apparatus 10. As illustrated in FIG. 2, the power transmission apparatus 10 includes the packet generation unit 110 and the power transmission unit 120.

The packet generation unit 110 generates a power packet by packetizing power to be supplied to the power transmission apparatus 10. The power transmission unit 120 performs power transmission of the power packet generated by the packet generation unit 110.

Specifically, the packet generation unit 110 packetizes the power to be supplied to the power transmission apparatus 10 for every power supply source. For example, as illustrated in FIG. 2, the packet generation unit 110 generates power packets 61 and 63 of renewable energy and power packets 62 and 64 of exhaustible energy to be supplied to the power transmission apparatus 10.

Here, as illustrated in FIG. 2, each power packet includes a header and a payload. The header is formed by a power pulse, and, for example, includes attribute information such as a power transmission source address, a power transmission destination address, power generation type information, and power amount information of the payload. The power generation type information may be information indicating renewable energy or exhaustible energy, information indicating greenhouse gas emission energy or non-greenhouse-gas-emission energy, information indicating environmental impact energy (for example, water power generation that destroys the environment due to dam construction, nuclear power generation presenting a risk of radioactive contamination, or the like) or non-environmental-impact energy, and information indicating nuclear power energy or non-nuclear power energy. Further: more detailed power generation types may be information indicating thermal power (in this regard, coal, oil, natural gas, methane hydrate, and the like), water power, nuclear power, sunlight, solar thermal, wind power, terrestrial heat, wave power, a temperature difference, biomass, and the like.

In addition, the header may include priority information indicating use priority of power to be transmitted in the payload. According to this configuration, the use of power can be controlled based on the priority information in the power control apparatus 20. Further, the header may include additional information like price information of power and information indicating an amount of greenhouse gas emission.

When a power transmission destination has been determined or when a power supply request has been received from the power transmission destination, the packet generation unit 110 sets an address of the power transmission destination to a power transmission destination address. When the power transmission destination is not determined, the packet generation unit 110 may not set a specific power transmission destination address to the power transmission destination address.

3. CONFIGURATION OF POWER CONTROL APPARATUS

The configuration of the power transmission apparatus 10 has been described above. Subsequently, the configuration of the power control apparatus 20 will be described with reference to FIG. 3.

Figure 3:
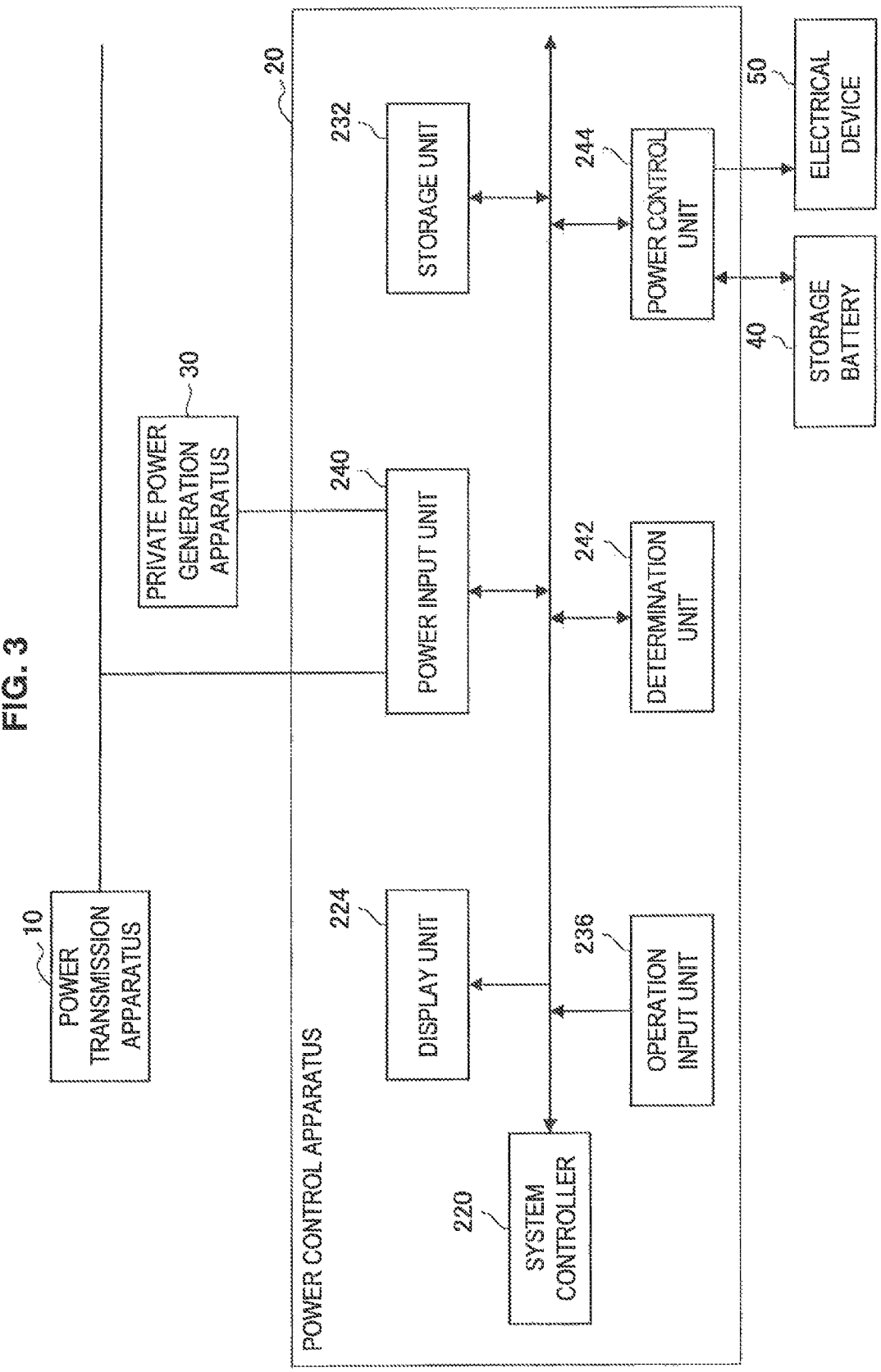
FIG. 3 is a functional block diagram illustrating a configuration of a power control apparatus 20 in accordance with an embodiment of the present disclosure.

FIG. 3 is a functional block diagram illustrating the configuration of the power control apparatus 20 in accordance with an embodiment of the present disclosure. As illustrated in FIG. 3, the power control apparatus 20 in accordance with the embodiment of the present disclosure includes a system controller 220, a display unit 224, a storage unit 232, an operation input unit 236, the power input unit 240, the determination unit 242, and the power control unit 244.

(System Controller)

The system controller 220, for example, includes a central processing unit (CPU), a read only memory (ROM), a random access memory (RAM), and the like, and controls a general operation of the power control apparatus 20. Although the power control unit 244 is illustrated separately from the system controller 220 in FIG. 3, a function of the power control unit 244 may be implemented by the system controller 220.

(Display Unit)

The display unit 224 drives a pixel driving circuit to display an image based on control of the system controller 220. For example, the display unit 224 may display an image indicating the remaining power of the storage battery 40 and display an image indicating a use state of power in the home.

(Storage Unit)

The storage unit 232 is used to store various data. For example, the storage unit 232 may store a power control knowledge database (DB), which is referred to by the power control unit 244 to control power. In addition, the storage section 232 may include a storage medium such as a nonvolatile memory, a magnetic disk, an optical disc, or a magnetic optical (MO) disc. An example of the nonvolatile memory may be a flash memory, a secure digital (SD) card, a micro SD card, a universal serial bus (USB) memory, an electrically erasable programmable ROM (EEPROM), and an erasable programmable ROM (EPROM). In addition, the magnetic disk may be a hard disk, a disk-shaped magnetic body disk, or the like. In addition, the optical disc may be a compact disc (CD), a digital versatile disc (DVD), a Blu-ray disc (BD) (registered trademark), or the like.

(Operation Input Unit)

The operation input unit 236 is a configuration for allowing a user to input an operation. The operation input unit 236 generates a signal corresponding to the user's operation and supplies the generated signal to the system controller 220. An example of this operation input unit 236 may be an operating element such as a touch panel, a button, a switch, a lever, or a dial, a light receiving unit for an infrared signal generated by a remote controller, a radio-signal receiving unit, or the like. Further, the operation input unit 236 may be a sensing device such as an acceleration sensor, an angular velocity sensor, a vibration sensor, or a pressure sensor.

(Power Input Unit)

The power input unit 240 receives a power packet supplied from the power transmission apparatus 10 and privately generated power supplied from the private power generation apparatus 30. Here, the power input unit 240 can detect a header of the power packet and switch whether or not to perform power reception of a subsequent payload according to control by the power control unit 244 based on content of the header.

(Determination Unit)

The determination unit 242 determines a type of generation of power that is transmitted in the payload of the power packet from the power generation type information included in the header of the power packet input to the power input unit 240. For example, the determination unit 242 may determine whether the power that is transmitted in the payload is renewable energy or exhaustible energy.

(Power Control Unit)

The power control unit 244 controls the use of power that is transmitted in the payload of the power packet based on the determination result of the power generation type by the determination unit 242. For example, the power control unit 244 by a certain control example may cause the power input unit 240 to receive power of the payload of the power packet determined by the determination unit 242 to be renewable energy and use the renewable energy transmitted in the payload. In addition, the power control unit 244 controls the use of privately generated power, electrical storage for the storage battery 40, the use of power of the storage battery 40, and the like. In addition, the power control unit 244 may request the power transmission apparatus 10 to transmit power to be used. Because various forms of power control by the above-described power control unit 244 are considered, a specific example of power control by the power control unit will be described hereinafter.

4. SPECIFIC EXAMPLE OF POWER CONTROL ($1A^{th}$ Control Example: Priority of Renewable Energy)

The power control unit 244 prioritizes the use of the renewable energy as the $1A^{th}$ control example. Hereinafter, the $1A^{th}$ control example will be described in further detail with reference to FIG. 4A. Although water power generation corresponds to renewable energy in the broad sense, the water power generation may not be classified into the renewable energy in the narrow sense because dam construction is actually necessary and nature is destroyed during the dam construction.

Figure 4A:
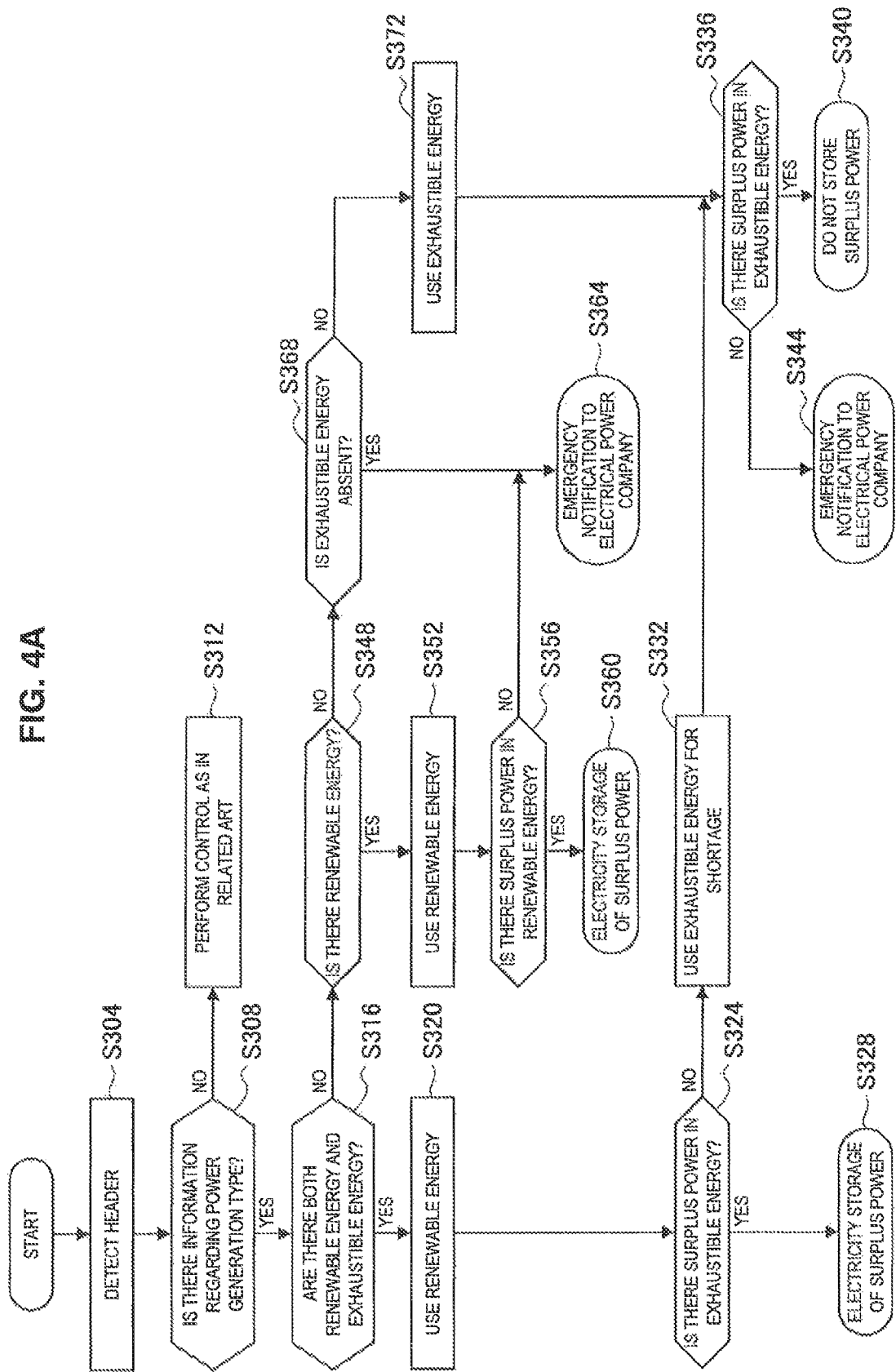
FIG. 4A is a flowchart illustrating a $1A^{th}$ control example by a power control unit.

FIG. 4A is a flowchart illustrating the $1A^{th}$ control example by the power control unit 244. As illustrated in FIG. 4A, if a header of a power packet is first detected by the power input unit 240 (S304), the determination unit 242 determines a type of generation of power to be transmitted according to the power packet from power generation type information when the power generation type information is included in the header (S308). Here, when the power generation type information is not included in the header, the power control apparatus 20 controls normal control (S312).

On the other hand, when there are both a power packet determined by the determination unit 242 to be renewable energy and a power packet determined by the determination unit 242 to be exhaustible energy (S316), the power control unit 244 controls power reception of the power packet of the renewable energy and uses the renewable energy (S320).

Further, when there is surplus power in the renewable energy (S324), the power control unit 244 controls electrical storage of the surplus power for the storage battery 40 (S328). On the other hand, when there is no surplus power in the renewable energy (S324), the power control unit 244 controls power reception of the power packet of the exhaustible energy and uses the exhaustible energy (S332). Further, the power control unit 244 determines whether or not there is surplus power in the exhaustible enemy (S336). The power control unit 244 does not perform electrical storage for the storage battery 40 even when there is surplus power (S340), and controls emergency notification for an electrical power company when there is no surplus power (S344).

On the other hand, when there is only a power packet determined by the determination unit 242 to be the renewable energy (S348), the power control unit 244 controls power reception of the power packet of the renewable energy and uses the renewable energy (S352). Further, when there is surplus power in the renewable power (S356), the power control unit 244 controls electrical storage of the surplus power for the storage battery 40 (S360). On the other hand, when there is no surplus power in the renewable energy (S356), the power control unit 244 controls emergency notification for the electrical power company (S364).

In addition, when there is neither of the power packet of the renewable energy and the power packet of the exhaustible energy (S368), the power control unit 244 controls emergency notification for the electrical power company (S364). On the other hand, when there is only a power packet determined by the determination unit 242 to be the exhaustible energy (S368), the power reception of the power packet of the exhaustible energy is controlled and the exhaustible energy is used (S372). Thereafter, the process proceeds to the process of S336.

As described above, according to the $1A^{th}$ control example, the use of renewable energy can be prioritized when there are both renewable energy and exhaustible energy. Although an example in which the surplus power of the renewable energy is stored and the surplus power of the exhaustible energy is not stored has been described above, this control example can be modified in various ways. For example, the power control unit 244 may store all the surplus power of the renewable energy and store the surplus power of the exhaustible energy at a predetermined ratio. Here, the predetermined ratio may be a value that differs according to a region or nation. In addition, the power control unit 244 may set a target electrical storage amount of the storage battery 40 and control the electrical storage of the renewable energy and the exhaustible energy so that the target electrical storage amount is achieved.

($1B^{th}$ Control Example: Priority of Non-Greenhouse-Gas-Emission Energy)

The power control unit 244 prioritizes the use of the non-greenhouse-gas-emission energy as the $1B^{th}$ control example. Hereinafter, the $1B^{th}$ control example will be more specifically described with reference to FIG. 4B. Although carbon dioxide ($CO_2$), methane ($CH_4$), nitrous oxide ($N_2O$), and the like are all examples of greenhouse gases, an amount of greenhouse gas emission may generally be interpreted as referring to an amount of $CO_2$ emission.

Figure 4B:
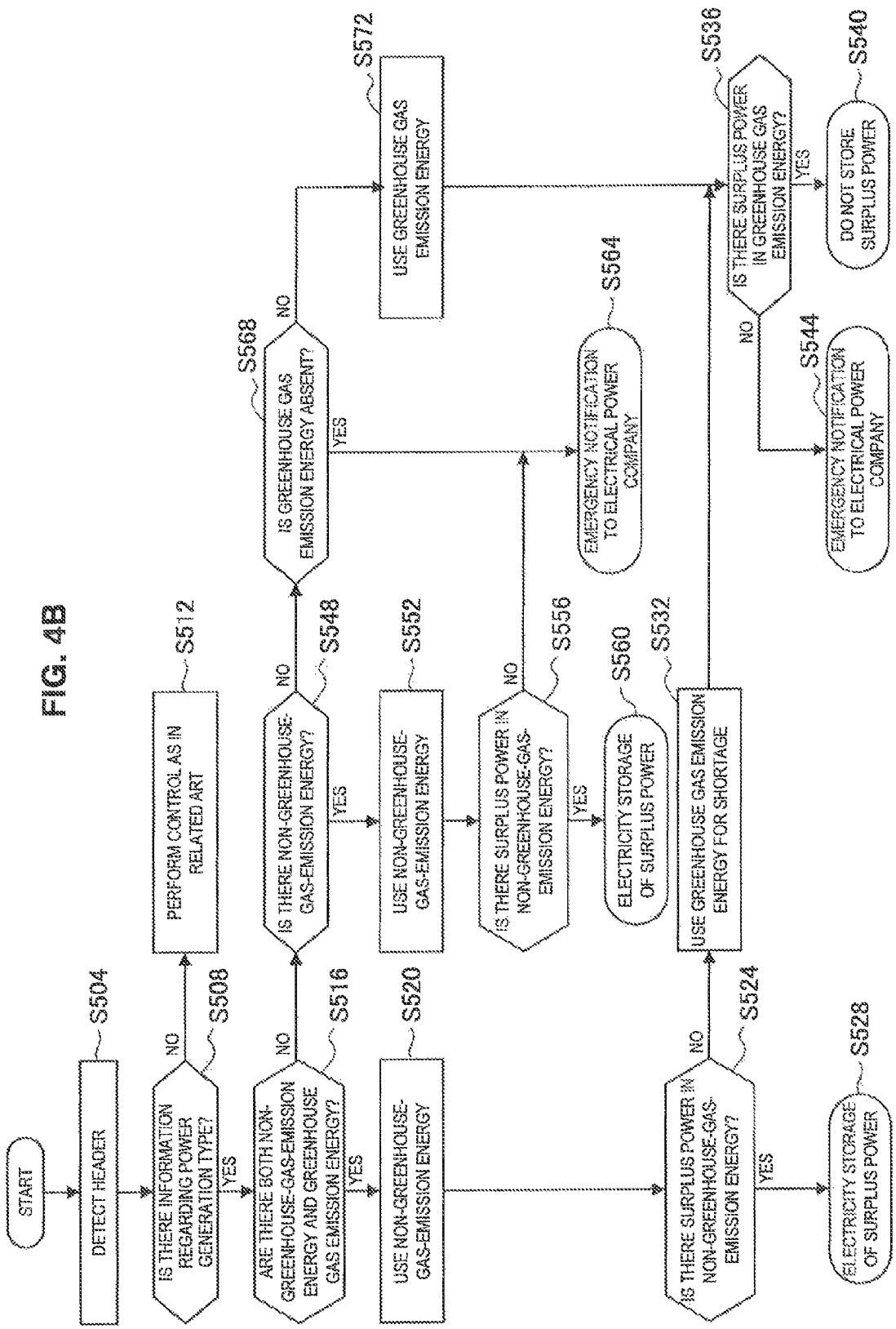
FIG. 4B is a flowchart illustrating a $1B^{th}$ control example by the power control unit.

FIG. 4B is a flowchart illustrating the $1B^{th}$ control example by the power control unit 244. As illustrated in FIG. 4B, if a header of a power packet is first detected by the power input unit 240 (S504), the determination unit 242 determines a type of power generation transmitted from the power generation type information according to the power packet when the power generation type information is included in the header (S508). Here, when the power generation type information is not included in the header, the power control apparatus 20 performs general control (S512).

On the other hand, when there are both a power packet determined by the determination unit 242 to be non-greenhouse-gas-emission energy and a power packet determined by the determination unit 242 to be greenhouse gas emission energy (S516), the power control unit 244 controls power reception of the power packet of the non-greenhouse-gas-emission energy and uses the non-greenhouse-gas-emission energy (S524).

Further, when there is surplus power in the non-greenhouse-gas-emission energy (S524), the power control unit 244 controls the electrical storage of surplus power for the storage battery 40 (S528). On the other hand, when there is no surplus power in the non-greenhouse-gas-emission energy (S524), the power control unit 244 controls power reception of the power packet of the greenhouse gas emission energy, and uses the greenhouse gas emission energy (S532). Further, the power control unit 244 determines whether or not there is surplus power in the greenhouse gas emission energy (S536). The power control unit 244 does not perform electrical storage for the storage battery 40 even when there is surplus power (S540), and controls emergency notification for the electrical power company when there is no surplus power (S544).

On the other hand, when there is only a power packet determined by the determination unit 242 to be the non-greenhouse-gas-emission energy (S548), the power control unit 244 controls power reception of the non-greenhouse-gas-emission energy, and uses the non-greenhouse-gas-emission energy (S552). Further, when there is surplus power in the non-greenhouse-gas-emission energy (S556), the power control unit 244 controls electrical storage of the surplus power for the storage battery 40 (S560). On the other hand, when there is no surplus power in the non-greenhouse-gas-emission energy (S556), the power control unit 244 controls emergency notification for the electrical power company (S564).

In addition, when there is neither of the power packet of the non-greenhouse-gas-emission energy and the power packet of the greenhouse gas emission energy (S568), the power control unit 244 controls emergency notification for the electrical power company (S564). On the other hand, when there is only a power packet determined by the determination unit 242 to be the greenhouse gas emission energy (S568), the power reception of the power packet of the greenhouse gas emission energy is controlled and the greenhouse gas emission energy is used (S572). Thereafter, the process proceeds to the process of S536.

As described above, according to the $1B^{th}$ control example, the use of non-greenhouse-gas-emission energy can be prioritized when there are both non-greenhouse-gas-emission energy and greenhouse gas emission energy. Although an example in which the surplus power of the non-greenhouse-gas-emission energy is stored and the surplus power of the greenhouse gas emission energy is not stored has been described above, this control example can be modified in various ways. For example, the power control unit 244 may store all the surplus power of the non-greenhouse-gas-emission energy and store the surplus power of the greenhouse gas emission energy at a predetermined ratio. Here, the predetermined ratio may be a value that differs according to a region or nation. In addition, the power control unit 244 may set a target electrical storage amount of the storage battery 40 and control the electrical storage of the non-greenhouse-gas-emission energy and the greenhouse gas emission energy so that the target electrical storage amount is achieved.

($1C^{th}$ Control Example: Priority of Non-Environmental-Impact Energy)

The power control unit 244 prioritizes the use of the non-environmental-impact energy having a small negative impact on the environment as the $1C^{th}$ control example. The non-environmental-impact energy can be regarded as a higher-order concept of renewable energy, non-greenhouse-gas-emission energy, non-nuclear power energy, and the like prioritized in the $1A^{th}$, $1B^{th}$, and $1D^{th}$ control examples. Although water power generation corresponds to renewable energy in the broad sense and corresponds to non-greenhouse-gas-emission energy, and non-nuclear power energy, the water power generation has a large negative impact on the environment because dam construction is actually necessary and nature is destroyed during the dam construction, and is classified into environmental impact energy. Hereinafter, the $1C^{th}$ control example will be more specifically described with reference to FIG. 4C.

Figure 4C:
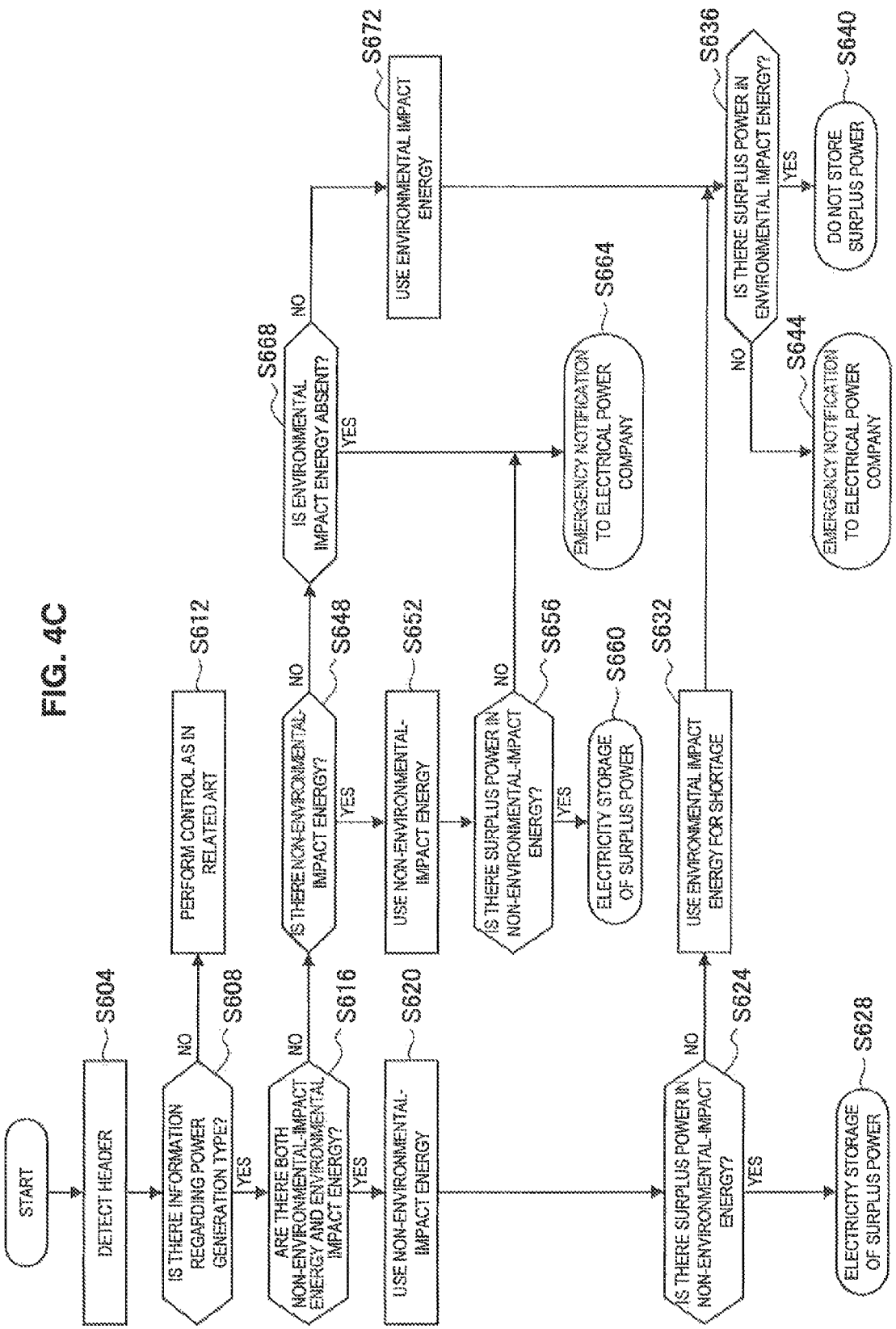
FIG. 4C is a flowchart illustrating a $1C^{th}$ control example by the power control unit.

FIG. 4C is a flowchart illustrating the $1C^{th}$ control example by the power control unit 244. As illustrated in FIG. 4C, if a header of a power packet is first detected by the power input unit 240 (S604), the determination unit 242 determines a type of generation of power to be transmitted according to the power packet from power generation type information when the power generation type information is included in the header (S608). Here, when the power generation type information is not included in the header, the power control apparatus 20 controls normal control (S612).

On the other hand, when there are both a power packet determined by the determination unit 242 to be non-environmental-impact energy and a power packet determined by the determination unit 242 to be environmental impact energy (S616), the power control unit 244 controls power reception of the power packet of the non-environmental-impact energy and uses the non-environmental-impact energy (S620).

Further, when there is surplus power in the non-environmental-impact energy (S624), the power control unit 244 controls electrical storage of the surplus power for the storage battery 40 (S628). On the other hand, when there is no surplus power in the non-environmental-impact energy (S624), the power control unit 244 controls power reception of the power packet of the environmental impact energy and uses the environmental impact energy (S632). Further, the power control unit 244 determines whether or not there is surplus power in the environmental impact energy (S636). The power control unit 244 does not perform electrical storage for the storage battery 40 even when there is surplus power (S640), and controls emergency notification for the electrical power company when there is no surplus power (S644).

On the other hand, when there is only a power packet determined by the determination unit 242 to be the non-environmental-impact energy (S648), the power control unit 244 controls power reception of the power packet of the non-environmental-impact energy and uses the non-environmental-impact energy (S652) Further, when there is surplus power in the non-environmental-impact energy (S656), the power control unit 244 controls electrical storage of the surplus power for the storage battery 40 (S660). On the other hand, when there is no surplus power in the non-environmental-impact energy (S656), the power control unit 244 controls emergency notification for the electrical power company (S664).

In addition, when there is neither of the power packet of the non-environmental-impact energy and the power packet of the environmental impact energy (S668), the power control unit 244 controls emergency notification for the electrical power company (S664). On the other hand; when there is only a power packet determined by the determination unit 242 to be the environmental impact energy (S668), the power reception of the power packet of the environmental impact energy is controlled and the environmental impact energy is used (S672). Thereafter, the process proceeds to the process of S636.

As described above, according to the $1C^{th}$ control example, the use of non-environmental-impact energy can be prioritized when there are both non-environmental-impact energy and environmental impact energy. Although an example in which the surplus power of the non-environmental-impact energy is stored and the surplus power of the environmental impact energy is not stored has been described above, this control example can be modified in various ways. For example, the power control unit 244 may store all the surplus power of the non-environmental-impact energy and store the surplus power of the environmental impact energy at a predetermined ratio. Here, the predetermined ratio may be a value that differs according to a region or nation. In addition, the power control unit 244 may set a target electrical storage amount of the storage battery 40 and control the electrical storage of the non-environmentalimpact energy and the environmental impact energy so that the target electrical storage amount is achieved.

($1D^{th}$ Control Example: Priority of Non-Nuclear Power Energy)

The power control unit 244 prioritizes the use of the non-nuclear power energy as the $1D^{th}$ control example. Hereinafter, the $1D^{th}$ control example will be more specifically described with reference to FIG. 4D.

Figure 4D:
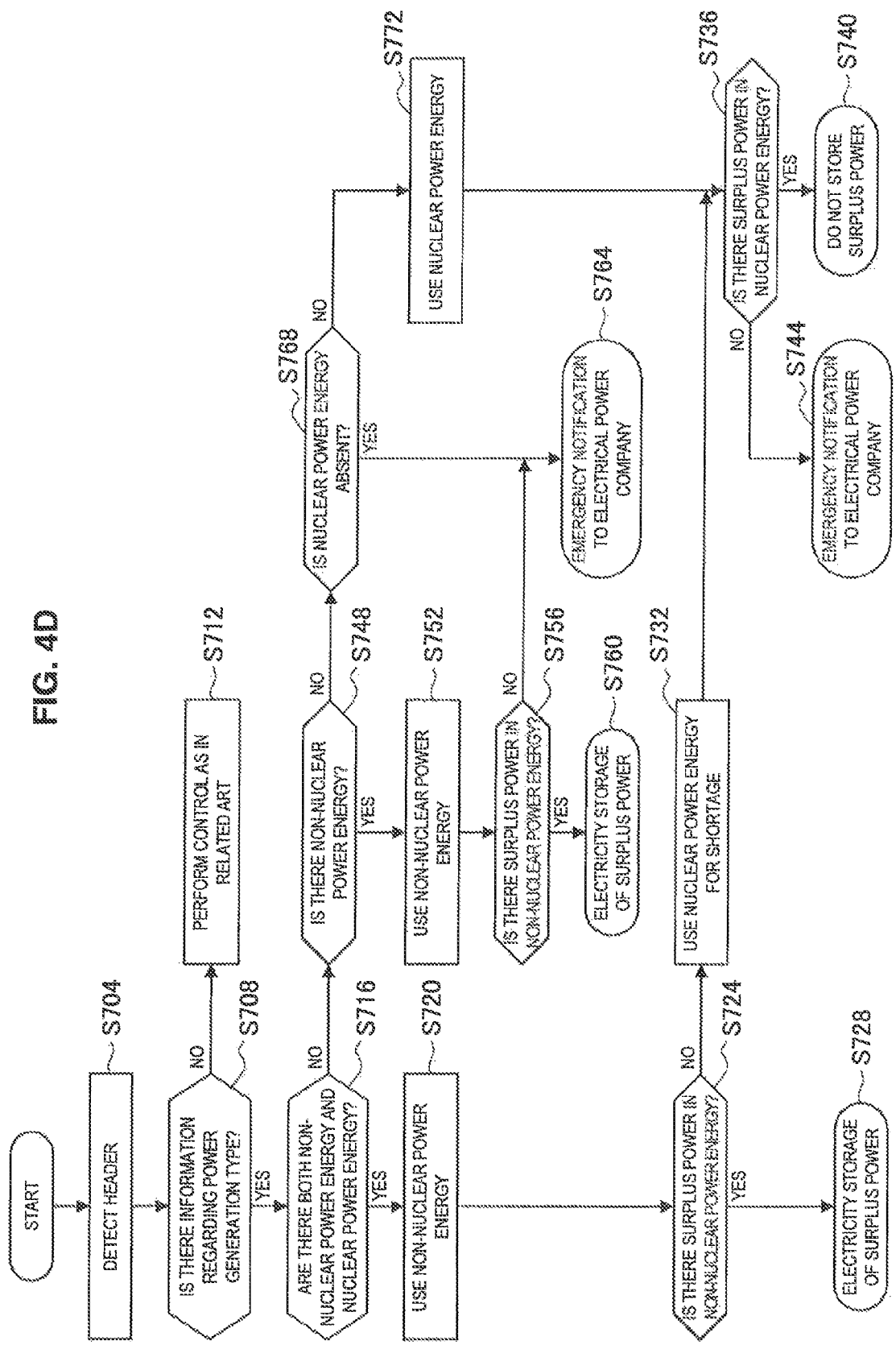
FIG. 4D is a flowchart illustrating a $1D^{th}$ control example by the power control unit.

FIG. 4D is a flowchart illustrating the $1D^{th}$ control example by the power control unit 244. As illustrated in FIG. 4D, if a header of a power packet is first detected by the power input unit 240 (S704), the determination unit 242 determines a type of power generation transmitted from the power generation type information according to the power packet when the power generation type information is included in the header (S708). Here, when the power generation type information is not included in the header, the power control apparatus 20 performs general control (S712).

On the other hand, when there are both a power packet determined by the determination unit 242 to be non-nuclear power energy and a power packet determined by the determination unit 242 to be nuclear power energy (S716), the power control unit 244 controls power reception of the power packet of the non-nuclear power energy and uses the non-nuclear power energy (S720).

Further, when there is surplus power in the non-nuclear power energy (S724), the power control unit 244 controls the electrical storage of surplus power for the storage battery 40 (S728). On the other hand, when there is no surplus power in the non-nuclear power energy (S724), the power control unit 244 controls power reception of the power packet of the nuclear power energy, and uses the nuclear power energy (S732). Further, the power control unit 244 determines whether or not there is surplus power in the nuclear power energy (S736). The power control unit 244 does not perform electrical storage for the storage battery 40 even when there is surplus power (S740), and controls emergency notification for the electrical power company when there is no surplus power (S744).

On the other hand, when there is only a power packet determined by the determination unit 242 to be the non-nuclear power energy (S748), the power control unit 244 controls power reception of the non-nuclear power energy, and uses the non nuclear power energy (S752). Further, when there is surplus power in the non-nuclear power energy (S756), the power control unit 244 controls electrical storage of the surplus power for the storage battery 40 (S760). On the other hand, when there is no surplus power in the non-nuclear power energy (S756), the power control unit 244 controls emergency notification for the electrical power company (S764).

In addition, when there is neither of the power packet of the non-nuclear power energy and the power packet of the nuclear power energy (S768), the power control unit 244 controls emergency notification for the electrical power company (S764). On the other hand, when there is only a power packet determined by the determination unit 242 to be the nuclear power energy (S768), the power reception of the power packet of the nuclear power energy is controlled and the nuclear power energy is used (S772). Thereafter, the process proceeds to the process of S736.

As described above, according to the $1D^{th}$ control example, the use of non-nuclear power energy can be prioritized when there are both non-nuclear power energy and nuclear power energy. Although an example in which the surplus power of the non-nuclear power energy is stored and the surplus power of the nuclear power energy is not stored has been described above, this control example can be modified in various ways. For example, the power control unit 244 may store all the surplus power of the non-nuclear power energy and store the surplus power of the nuclear power energy at a predetermined ratio. Here, the predetermined ratio may be a value that differs according to a region or nation. In addition, the power control unit 244 may set a target electrical storage amount of the storage battery 40 and control the electrical storage of the non-nuclear power energy and the nuclear power energy so that the target electrical storage amount is achieved.

(Second Control Example: Control Based on Power Utility Rate)

The power control unit 244 controls the use of power according to a relationship of a power utility rate for every power generation type as the second control example. Hereinafter, the second control example will be more specifically described with reference to FIG. 5.

FIG. 5 is a flowchart illustrating the second control example by the power control unit 244. As illustrated in FIG. 5, the power control unit 244 first recognizes fee A per unit amount of renewable energy (yen/kWh) and fee B per unit amount of exhaustible energy (yen/kWh) (S404 and S408). An electricity rate recognized by the power control unit 244 may be published on a network or input to a user. Further, when electricity rate information is included in a power packet, the power control unit 244 may recognize the electricity rate based on the electricity rate information included in the power packet.

Thereafter, when fee A is less than a sum of fee B and set value C(S412), the power control unit 244 controls power reception of a power packet of renewable energy and uses the renewable energy (S416). On the other hand, when fee A is greater than or equal to the sum of fee B and set value C(S412), the power control unit 244 controls power reception of a power packet of exhaustible energy and uses the exhaustible energy (S420).

For example, when C=10, A=35, and B=20, the power control unit 244 uses the exhaustible energy according to the flow illustrated in FIG. 5. On the other hand, when C=10: A=28, and B=20, the power control unit 244 uses the renewable energy according to the flow illustrated in FIG. 5. Here, set value C may differ according to a region or nation and may be designated by the user.

Although an example in which one of the renewable energy and the exhaustible energy based on the electricity rate has been described above, this control example can be modified in various ways. For example, the power control unit 244 may use the renewable energy and the exhaustible energy at a ratio corresponding to a difference between the fee of the renewable energy and the fee of the exhaustible energy.

As a specific example, the power control unit 244 may control the use of power as follows according to a value of (A−B).

A−B<3 yen Renewable Energy: Exhaustible Enemy=10:0

3 yen≤A−B<7 yen Renewable Energy: Exhaustible Energy=7:3

7 yen≤A−B Renewable Energy: Exhaustible Energy=0:10

In addition, although an example in which power is classified roughly into the renewable energy and the exhaustible energy has been described above, this embodiment is applicable even when the renewable energy is sub-divided into power for every type of power generation such as solar power generation, solar thermal power generation, wind power generation, geothermal power generation, wave power generation, temperature difference power generation, biomass power generation, and the like and the exhaustible energy is sub-divided into power for every detailed type of power generation such as classification into types of fossil fuels, for example, coal, oil, natural gas, and methane hydrate, even in the same thermal power generation such as thermal power generation and nuclear power veneration. In addition, this control example is applicable even when the electricity rate is fixedly set or fluctuates in real time.

(Third Control Example: Control Based on Amount of Greenhouse Gas Emission)

The power control unit 244 controls the use of power in consideration of the amount of greenhouse gas emission as the third control example. For example, the power control unit 244 by the third control example prioritizes the use of exhaustible energy because the normal fee of the exhaustible energy is cheaper than that of renewable energy. Although $CO_2$, $CH_4$, $N_2O$, and the like are all examples of greenhouse gases, an amount of greenhouse gas emission may generally be interpreted as referring to an amount of $CO_2$ emission.

As a specific example, the power control unit 244 uses the exhaustible energy in a range in which an amount of greenhouse gas emission per unit time (kg/h) does not exceed a predetermined value, and uses the renewable energy for a shortage when the shortage of power to be used has occurred. According to this configuration, the amount of greenhouse gas emission can be continuously suppressed to a fixed amount or less. Here, the amount of greenhouse gas emission (kg/h) by the use of exhaustible energy may be preset and information indicating the amount of greenhouse gas emission may be included in a power packet.

Although an amount of greenhouse gas emission per hour (kg/h) as the amount of greenhouse gas emission per unit time has been described above, the use of exhaustible energy can be controlled so that an amount of greenhouse gas emission per day (kg/d) does not exceed a predetermined value according to this control example.

(Fourth Control Example: Control Based on Prediction)

The power control unit 244 controls electrical storage for the storage battery 40 so that a use amount of exhaustible energy is reduced according to a predicted value of renewable energy to be supplied in the future as the fourth control example. Hereinafter, the fourth control example will be more specifically described with reference to FIGS. 6 and 7.

Figure 6:
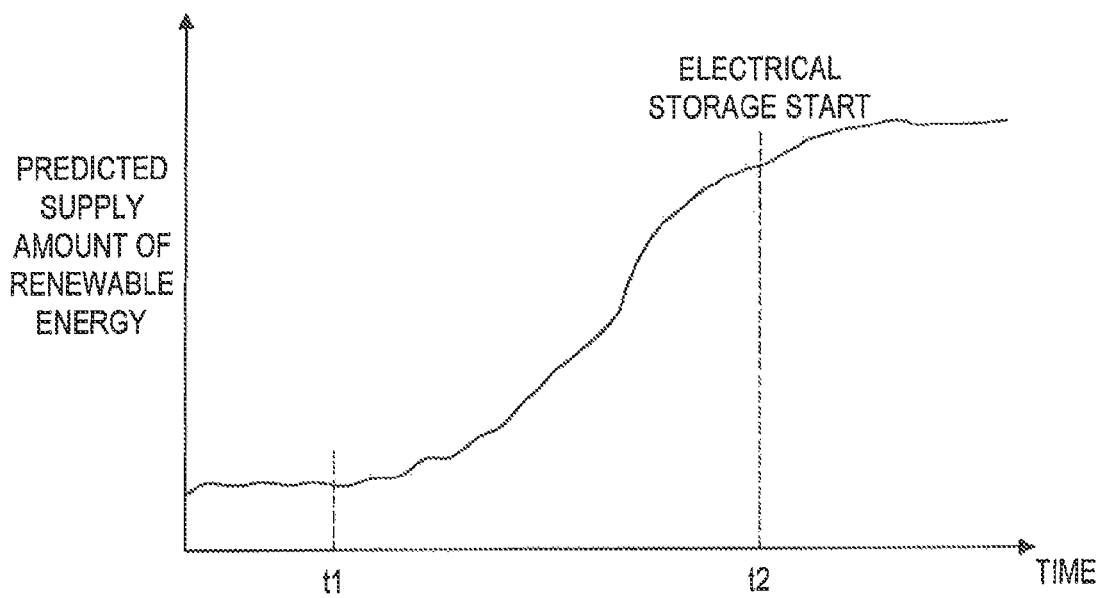
FIG. 6 is an explanatory diagram illustrating a relationship between a future predicted supply amount of renewable energy and electrical storage start timing.
Figure 7:
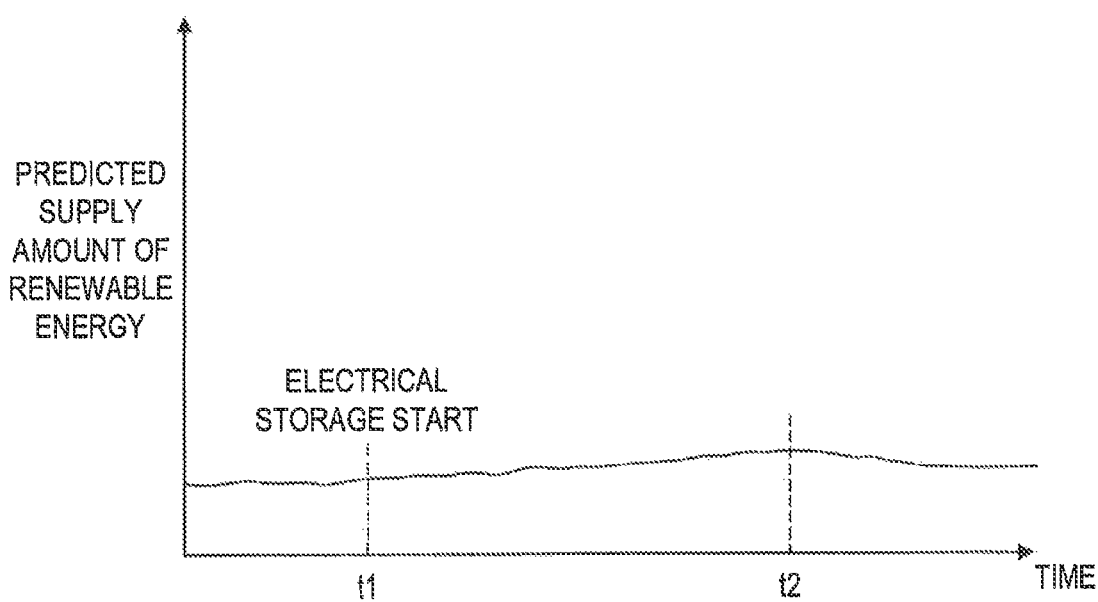
FIG. 7 is an explanatory diagram illustrating a relationship between a future predicted supply amount of renewable energy and electrical storage start timing.

FIGS. 6 and 7 are explanatory diagrams illustrating a relationship between a future predicted supply amount of renewable energy and electrical storage start timing. If the remaining amount of the storage battery 40 is 0 at t1 illustrated in FIG. 6 and a supply amount of renewable energy at t1 is small, but the supply amount of renewable energy is expected to gradually increase, the power control unit 244 keeps electrical storage on standby until t2 at which the supply amount of renewable energy is predicted to increase, and starts the electrical storage using the renewable energy at t2.

On the other hand, if the remaining amount of the storage battery 40 is 0 at t1 illustrated in FIG. 7, a supply amount of renewable energy at t1 is small, and the supply amount of renewable energy is expected not to increase for some time, the power control unit 244 starts electrical storage using the exhaustible energy at t1.

As described above, if the current supply amount of renewable energy is small even when the remaining amount of the storage battery 40 is small, it is possible to suppress a use amount of exhaustible energy by starting the electrical storage, or keeping the electrical storage on standby, based on a future predicted supply amount of renewable energy.

The future predicted supply amount of renewable energy can be estimated based on a previous statistical value or a predicted weather condition.

(Fifth Control Example: Control Based on Actual Measurement)

The power control unit 244 controls the use of power based on an actual use amount of exhaustible energy as the fifth control example. For example, the power control unit 244 sets an upper-limit value of the use of the exhaustible energy (per unit time or per day), and the exhaustible energy is used until the value of the use exceeds the upper-limit value of the use. The power control unit 244 moves to an exhaustible energy power-saving mode by employing the renewable energy after an actually used amount of exhaustible energy has exceeded the upper-limit value of the use. The power control unit 244 may suppress a use amount of exhaustible energy when an actually used amount of exhaustible energy is close to the upper-limit value of the use.

In addition, this control example can be modified in various ways. For example, the power control unit 244 may set a target value of use balance between renewable energy and exhaustible energy, and control the use of power according to actual use balance and the target value. For example, if a target value of a use ratio of the renewable energy is greater than or equal to 70% and a target value of a use ratio of the exhaustible energy is less than 30%, the power control unit 244 may suppress a use amount of exhaustible energy when the use ratio of the renewable energy is less than 75%.

(Sixth Control Example: Control Based on Weather Condition, Etc.)

The power control unit 244 controls the use of power based on the weather condition, etc, as the sixth control example. For example, because an amount of power generation by solar power generation is considered to be large on a sunny day, the power control unit 244 may prioritize the use of power obtained by the solar power generation on the sunny day. In addition, because the amount of power generation by the solar power generation is considered to be small on a day with strung winds such as a typhoon, the power control unit 244 may prioritize the use of power obtained by wind power generation on the day with strong winds such as the typhoon.

In addition, because the exhaustible energy is generally likely to be used if a difference between the outdoor air temperature and the indoor temperature is as high as, for example, 30° C. or higher, the power control unit 244 may positively use the renewable energy at a higher rate than in normal time.

In addition, because the cooling or heating intensity is considered to be high when a temperature difference between the outdoor air temperature and the indoor temperature is greater than or equal to a fixed value, the power control unit 244 may suppress the use of exhaustible energy. Simultaneously, the power control unit 244 may also suppress the use of renewable energy.

In addition, if the outdoor air humidity during daytime is as high as 80% or higher, it is likely to be raining or to begin raining soon, in this case, because an amount of power generation by solar power generation is low, the power control unit 244 may prioritize the use of power obtained by a type of power generation other than the solar power generation.

(Seventh Control Example: Control Based on Priority Information)

The power control unit 244 controls the use of power based on the priority information included in a power packet as the seventh control example. For example, the power transmission apparatus 10 may add priority information indicating high priority to the power packet of renewable energy. In this case, the power control unit 244 can preferentially use the renewable energy by controlling the use of power according to the priority information.

In addition, when there is a bias in a power amount for every power generation type, the power transmission apparatus 10 may add priority information indicating high priority to a power packet of a type of power generation having a large amount of power. In this case, the power control unit 244 can contribute to optimization of the use of power by controlling the macro use of power according to the priority information.

(Eighth Control Example: Control Considering Peak Time Band)

The power control unit 244 controls the use of control in consideration of a peak time band as the eighth control example. In summer, for example, a time between about 13:00 and 15:00 corresponds to the peak time band. However, because the power demand for a supply amount of commercial power is tight in the peak time band, it is desirable to reduce a use amount of commercial power. The power control unit 244 may control the use of power so that a ratio of private power generation by the private power generation apparatus 30 to a total use amount of power in the peak time band is higher than a ratio of private power generation by the private power generation apparatus 30 to the total use amount of power in a time band excluding the peak time band. According to this configuration, it is possible to reduce a use amount of commercial power in the peak time band.

(Ninth Control Example: Control Based on Power Component Ratio)

Although an example in which power to be transmitted according to each power packet is obtained by a single type of power generation has been described above, the power to be transmitted according to each power packet may be obtained by a plurality of types of power generation. In addition, the power transmission apparatus 10 may add information indicating a component ratio of power for every type of power generation to a header of the power packet. In this case, the power control unit 244 can control the use of power according to the information indicating the component ratio of power as the ninth control example.

For example, when a component ratio of renewable energy is higher than a component ratio of exhaustible energy, or when the component ratio of renewable energy is higher than a predetermined value, the power control unit 244 may use a power packet that is transmitted for power transmission from the power transmission apparatus 10. On the other hand, when the component ratio of exhaustible energy is higher than the component ratio of renewable energy, or when the component ratio of exhaustible energy is higher than a predetermined value, the power control unit 244 may not use a power packet that is transmitted for power transmission from the power transmission apparatus 10.

5. CONCLUSION

It should be understood by those skilled in the art that various modifications, combinations, sub-combinations and alterations may occur depending on design requirements and other factors insofar as they are within the scope of the appended claims or the equivalents thereof.

For example, the steps in processing of the power control apparatus 20 according to this specification are not necessarily processed in time series in the order described as the flowchart. For example, the steps in processing of the power control apparatus 20 can also be processed in an order different from that described as the flowchart or in parallel.

In addition, although an example in which power generation type information is added to each power packet has been described above, a type of generation of power to be transmitted according to a power packet and a type of power generation indicated by power generation type information are not necessarily consistent. For example, the power transmission apparatus 10 may mix power supplied from power generation facilities and add power generation type information indicating power generation types in the power generation facilities to power packets, the number of which corresponds to a ratio of an amount of power generation by each power generation facility.

In addition, a computer program for causing hardware such as a CPU, ROM, or RAM embedded in the power control apparatus 20 to implement a function equivalent to each configuration of the power control apparatus 20 described above can also be created. In addition, a storage medium storing the computer program is also provided.

Additionally, the present technology may also be configured as below.

(1) A power control apparatus including:

an input unit to which attribute information regarding a type of generation of power is input;

a determination unit configured to determine the type of generation of the power corresponding to the attribute information according to the attribute information; and a power control unit configured to control use of the power according to a determination result by the determination unit.

(2) The power control apparatus according to (1), wherein the determination unit determines whether the power corresponding to the attribute information has a large impact on the natural environment, and wherein the power control unit prioritizes use of energy having a small impact on the natural environment.

(3) The power control apparatus according to (2), wherein the determination unit determines whether the power corresponding to the attribute information is renewable energy or exhaustible energy, and wherein the power control unit prioritizes use of the renewable energy.

(4) The power control apparatus according to (2), wherein the determination unit determines whether or not the power corresponding to the attribute information emits greenhouse gas at an emission amount greater than or equal to a predetermined value, and wherein the power control unit prioritizes use of energy having an emission amount of greenhouse gas that is less than the predetermined value.

(5) The power control apparatus according to (2), wherein the determination unit determines whether or not the power corresponding to the attribute information is nuclear power energy, and wherein the power control unit prioritizes use of energy that is not the nuclear power energy.

(6) The power control apparatus according to (1), wherein the power control unit controls the use of the power according to a relationship of a fee of the power for every type of power generation.

(7) The power control apparatus according to (6), wherein the determination unit determines whether the power corresponding to the attribute information is renewable energy or exhaustible energy, and wherein the power control unit controls the use of the power according to a relationship between a fee per unit amount of the renewable energy and a fee per unit amount of the exhaustible energy (8) The power control apparatus according to (7), wherein, when the fee per unit amount of the renewable energy is less than a sum of the fee per unit amount of the exhaustible energy and a set value, the power control unit selects the use of the renewable energy.

(9) The power control apparatus according to (8), wherein the set value is designated according to a region or nation.

(10) The power control apparatus according to (8), wherein the power control unit selects the use of the renewable energy and use of the exhaustible energy at a ratio corresponding to a difference between the fee per unit amount of the renewable energy and the fee per unit amount of exhaustible energy.

(11) The power control apparatus according to (1),
wherein the determination unit determines whether the power corresponding to the attribute information is renewable energy or exhaustible energy, and
wherein, when there is surplus power of the renewable energy, the power control unit controls the surplus power to be stored.

(12) The power control apparatus according to (1),
wherein the determination unit determines whether the power corresponding to the attribute information is renewable energy or exhaustible energy, and
wherein, when there is the surplus power of the exhaustible energy, the power control unit controls surplus power to be stored at a predetermined ratio.

(13) The power control apparatus according to (1), wherein the power control unit controls the use of power so that a ratio of power of private power generation among power to be used in a peak time hand is higher than in other time bands.

(14) The power control apparatus according to (1), wherein the power control unit selects a type of generation of power to be preferentially used according to a weather condition, temperature or humidity.

(15) The power control apparatus according to (1), wherein the power control unit controls electrical storage for a storage battery according to a predicted value of renewable energy to be supplied in the future.

(16) The power control apparatus according to (1), wherein the power control unit controls the use of the power according to an actual use amount per unit time of exhaustible energy.

(17) The power control apparatus according to (1), wherein the power control unit controls the use of the power according to other attribute information corresponding to the power.

(18) The power control apparatus according to (1),
wherein the attribute information indicates a component ratio of the power for every type of power generation, and
wherein the power control unit controls the use of the power according to the component ratio indicated by the attribute information.

(19) The power control apparatus according to (1), wherein the power control unit designates the type of power generation to request the power.

(20) A power transmission apparatus including:
a power transmission unit; and
an information addition unit configured to add priority information and attribute information regarding a type of generation of power to the power to be transmitted from the power transmission unit.

(21) A power control system including:
a power transmission apparatus; and
a power control apparatus,
wherein the power transmission apparatus includes
a power transmission unit; and
an information addition unit configured to add attribute information regarding a type of generation of power to the power to be transmitted from the power transmission unit, and
wherein the power control apparatus includes
an input unit to which the attribute information is input;
a determination unit configured to determine the type of generation of the power corresponding to the attribute information according to the attribute information; and
a power control unit configured to control use of the power according to a determination result by the determination unit.

The present disclosure contains subject matter related to that disclosed in Japanese Priority Patent Application JP 2011-257602 filed in the Japan Patent Office on Nov. 25, 2011, the entire content of which is hereby incorporated by reference.

What is claimed is:

1. A power control apparatus to control supply of packetized power to one or more electrical devices that consume power, the power control apparatus comprising:
   at least one control circuit adapted to act as:
      an input unit to which is input attribute information regarding a type of generation of power for a power packet, wherein the power packet comprises a header and a payload, the payload comprising the power of the power packet in packetized form, the header of the power packet being a power pulse;
      a determination unit configured to determine the type of generation of the power packet according to the attribute information for the power packet; and
      a power control unit configured to control use of power of the power packet according to a determination result by the determination unit,
   wherein the determination unit evaluates an impact of a source of power of the power packet, indicated by the attribute information for the power packet, on a natural environment,
   wherein the power control unit prioritizes use of power based on impact of sources of power of power packets on the natural environment,
   wherein the determination unit determines whether or not the source of the power of the power packet, as indicated by the attribute information for the power packet, emits greenhouse gas at an emission amount greater than or equal to a predetermined value, and
   wherein the power control unit prioritizes use of power for which a source of the power has an emission amount of greenhouse gas that is less than the predetermined value.

2. The power control apparatus according to claim 1,
wherein the determination unit determines whether the source of power of the power packet, indicated by the attribute information for the power packet, is renewable energy or exhaustible energy, and
wherein the power control unit prioritizes use of renewable energy.

3. The power control apparatus according to claim 1,
wherein the determination unit determines whether or not the source of the power of the power packet, as indicated by the attribute information of the power packet, is nuclear power energy, and wherein the power control unit prioritizes use of power produced by a source that is not the nuclear power energy.

4. The power control apparatus according to claim 1, wherein the power control unit controls the use of the power of the power packet according to a relationship of a fee of the power for every type of power generation.

5. The power control apparatus according to claim 4, wherein the determination unit determines whether the power of the power packet according to the attribute information is renewable energy or exhaustible energy, and
wherein the power control unit controls the use of the power of the power packet according to a relationship between a fee per unit amount of the renewable energy and a fee per unit amount of the exhaustible energy.

6. The power control apparatus according to claim 5, wherein, when the fee per unit amount of the renewable energy is less than a sum of the fee per unit amount of the exhaustible energy and a set value, the power control unit selects the use of the renewable energy.

7. The power control apparatus according to claim 6, wherein the set value is designated according to a region or nation.

8. The power control apparatus according to claim 6, wherein the power control unit selects the use of the renewable energy and use of the exhaustible energy at a ratio corresponding to a difference between the fee per unit amount of the renewable energy and the fee per unit amount of exhaustible energy.

9. The power control apparatus according to claim 1, wherein the determination unit determines whether the power of the power packet according to the attribute information is renewable energy or exhaustible energy, and wherein, when there is surplus power of the renewable energy, the power control unit controls the surplus power to be stored.

10. The power control apparatus according to claim 1, wherein the determination unit determines whether the power of the power packet according to the attribute information is renewable energy or exhaustible energy, and wherein, when there is the surplus power of the exhaustible energy, the power control unit controls surplus power to be stored at a predetermined ratio of the renewable energy to the exhaustible energy.

11. The power control apparatus according to claim 1, wherein the power control unit controls the use of power so that a ratio of power of private power generation among power to be used in a peak time band is higher than in other time bands.

12. The power control apparatus according to claim 1, wherein the power control unit selects a type of generation of power to be preferentially used according to a weather condition, temperature or humidity.

13. The power control apparatus according to claim 1, wherein the power control unit controls electrical storage for a storage battery according to a predicted value of renewable energy to be supplied in the future.

14. The power control apparatus according to claim 1, wherein the power control unit controls the use of the power of the power packet according to an actual use amount per unit time of exhaustible energy.

15. The power control apparatus according to claim 1, wherein the power control unit controls the use of the power packet according to other attribute information corresponding to the power packet.

16. The power control apparatus according to claim 1, wherein the attribute information indicates a component ratio of power for every type of power generation, and wherein the power control unit controls the use of power according to the component ratio indicated by the attribute information.

17. The power control apparatus according to claim 1, wherein the power control unit designates the type of power generation to request for power.

18. The power control apparatus according to claim 1, wherein:
the header of the power packet includes data indicating the attribute information.

19. The power control apparatus according to claim 18, wherein:
the attribute information comprises a power transmission source address, a power transmission destination address, and/or a power amount of the payload.

20. A power transmission apparatus to transmit packetized power, the power transmission apparatus comprising:
at least one control circuit adapted to act as:
a power transmission unit; and
an information addition unit configured to add, to a power packet to be transmitted from the power transmission unit, priority information and attribute information regarding a type of generation of power for the power packet,
wherein the power packet comprises a header and a payload, the payload comprising the power of the power packet in packetized form, the header of the power packet being a power pulse,
wherein the attribute information for the power packet indicates an impact of a source of power of the power packet on a natural environment,
wherein the impact of the source of power of the power packet on the natural environment is used to prioritize use of power,
wherein the attribute information for the power packet indicates whether or not the source of the power of the power packet emits greenhouse gas at an emission amount greater than or equal to a predetermined value, and
wherein whether or not the source of the power of the power packet emits greenhouse gas at the emission amount greater than or equal to the predetermined value is used to prioritize use of power.

21. A power control system comprising:
a power transmission apparatus to transmit packetized power; and
a power control apparatus to control supply of packetized power to one or more electrical devices that consume power,
wherein the power transmission apparatus includes at least one first control circuit adapted to act as:
a power transmission unit; and
an information addition unit configured to add, to a power packet to be transmitted from the power transmission unit, attribute information regarding a type of generation of power for the power packet, and
wherein the power control apparatus includes at least one second control circuit adapted to act as:
an input unit to which is input the attribute information;
a determination unit configured to determine the type of generation of the power packet according to the attribute information for the power packet; and a power control unit configured to control use of power of the power packet according to a determination result by the determination unit, wherein the determination unit evaluates an impact of a source of power of the power packet, indicated by the attribute information for the power packet, on a natural environment, wherein the power control unit prioritizes use of power based on impact of sources of power of power packets on the natural environment, wherein the determination unit determines whether or not the source of the power of the power packet, as indicated by the attribute information for the power packet, emits greenhouse gas at an emission amount greater than or equal to a predetermined value, and wherein the power control unit prioritizes use of power for which a source of the power has an emission amount of greenhouse gas that is less than the predetermined value.

* * * * *